United States Patent [19]

Kalinoski

[11] Patent Number: 5,447,073
[45] Date of Patent: Sep. 5, 1995

[54] MULTIMEASUREMENT REPLACEABLE VORTEX SENSOR

[75] Inventor: Richard W. Kalinoski, Rumford, R.I.

[73] Assignee: The Foxboro Company, Foxboro, Mass.

[21] Appl. No.: 192,237

[22] Filed: Feb. 4, 1994

[51] Int. Cl.⁶ .............................................. G01F 1/32
[52] U.S. Cl. .............................. 73/861.24; 73/861.22; 73/719
[58] Field of Search ................ 73/861.22, 861.24, 719, 73/721

[56] References Cited

U.S. PATENT DOCUMENTS

| | | | |
|---|---|---|---|
| 4,085,614 | 4/1978 | Curran et al. | 73/194 |
| 4,448,081 | 5/1984 | Kolitsch et al. | 73/861.24 |
| 4,520,678 | 6/1985 | Koziol et al. | 73/861.24 |
| 4,565,096 | 1/1986 | Knecht | 73/718 |
| 4,891,988 | 1/1990 | Tada | 73/861.22 |
| 4,986,127 | 1/1991 | Shimada et al. | 73/861.61 |
| 5,012,677 | 5/1991 | Shimada et al. | 73/721 |
| 5,209,125 | 5/1993 | Kalinoski et al. | 73/861.24 |

Primary Examiner—Richard Chilcot
Assistant Examiner—Harshad Patel
Attorney, Agent, or Firm—Clare Hartnett

[57] ABSTRACT

A sensor for use in a vortex flow meter capable of measuring various physical characteristics of a flow in a single process penetration from a common source. A shedder bar in the vortex meter generates alternating vortices. The sensor, which is fluidly connected to the vortex meter, comprises one or more pressure and temperature sensing diaphragms containing piezoresistor elements arranged in a Wheatstone bridge configuration. The sensor produces electric signals indicative of flow velocity, fluid pressure, and temperature. These signals are transmitted to a processing element which computes additional flow parameters.

22 Claims, 13 Drawing Sheets

MULTIMEASUREMENT REPLACEABLE VORTEX SENSOR

BACKGROUND

1. Field of the Invention

The present invention relates to flow measuring apparatus. More particularly, it relates to sensors for vortex flowmeters and to piezoresistive pressure sensors.

2. Description of the Prior Art

It has been known for many years that vortices are developed in a fluid flowing past a non-streamlined obstruction. It also has been known that with certain arrangements vortices are developed by alternately shedding at regular intervals from opposite edges of the obstruction to form corresponding rows of vortices. Such vortices establish a so-called von Karman "vortex street," which is a stable vortex formation consisting of two nearly-parallel rows of evenly-spaced vortices travelling with the flow stream.

In a von Karman vortex street, the vortices of one row are staggered relative to those of the other row by approximately one-half the distance between consecutive vortices in the same row. The spacing between successive vortices in each row is very nearly constant over a range of flow rates, so that the frequency of vortex formation is correspondingly proportional to the velocity of the fluid. Thus, by sensing the frequency of vortex formation it is possible to measure the fluid flow rate. Devices for that purpose are often referred to as vortex meters.

Various types of vortex meters have been available commercially for a number of years. Typically, these vortex meters comprise a vortex-shedding body mounted in a flow tube together with a sensor for detecting the frequency of vortex formation. Sensors used to detect the vortices often include diaphragms which fluctuate in response to alternating differential pressure variations generated by the vortices. For example, in U.S. Pat. Nos. 4,085,614 to Curran et al. and in 4,520,678 to Koziol et al., pressure applied to the diaphragms is transferred to a piezoelectric sensor which then produces electronic signals responsive to differential pressure applied to the diaphragms. This differential pressure measurement is used, in turn, to measure the frequency of vortex formation and ultimately the fluid flow rate or velocity.

A limitation of this type of sensor is that it is capable of making only one measurement in a single process penetration, specifically, measuring the frequency of differential pressure fluctuations used to compute the flow velocity. Additional instruments and process penetrations would be required in order to obtain additional measurement quantities, such as process fluid pressure or temperature. This increases the risk of releases of fugitive emissions and fluid loss and bears an increased cost for the purchase and installation of the additional instruments. Another disadvantage of additional process penetrations is the loss of accuracy in the measurements due to varying sampling points. Since the physical characteristics of the fluid changes within the flow, accurate measurements would require a common source point from which to sample within a single penetration.

It is the object of the present invention to provide a sensor which provides multimeasurement capabilities at a common source point within a single process penetration for use, in particular, within a vortex flowmeter.

A more specific object of the invention is to provide a more accurate computation of fluid density by providing a means for multimeasurement capabilities. The frequency and amplitude of the alternating differential pressure signals created by the shedding vortices, the process fluid pressure, and temperature can all be measured at a common source point with a single sensor and in a single process penetration.

A further specific object of the invention is to employ the use of a sensor with piezoresistive materials which is capable of making multiple measurements.

A further specific object of the invention is to use the multiple measurements to derive other computations, such as density, absolute and kinematic viscosity, Reynold's No., and the mass flow rates of both liquids and gases.

Other general and specific objects of this invention will be apparent and evident from the accompanying drawings and the following description.

SUMMARY OF THE INVENTION

This invention results from the realization that accurate multiple measurements of the physical characteristics of a fluid's flow can be made within a vortex flowmeter in a single process penetration from a common source point. It is the object of this invention to produce such a sensor.

Prior to the summary of the invention, it should be noted that within this application process fluid pressure will be referred to as pressure, process fluid temperature will be referred to as temperature, the alternating differential pressure generated by the vortices shed from the shedder bar will be referred to as differential pressure, and polycrystalline silicon will be referred to as polysilicon.

This invention features a sensor for use within a flow pipe having a fluid flow and a shedder bar for generating vortices. The sensor is physically located outside of the flow pipe yet fluidly connected. The sensing diaphragms with piezoresistors are hermetically sealed in a sensor housing having two highly corrosion resistant process isolation diaphragms. Cavities on either side of the sensing diaphragms are filled with an inert fluid which is also an electrical insulator. This fluid transmits the alternating differential pressure, process fluid pressure, and temperature from the process diaphragms to the sensing diaphragms.

In the first embodiment, the sensor contains two sensing diaphragms each with piezoresistors arranged in a Wheatstone bridge configuration. One sensing diaphragm is coupled to one of the process isolation diaphragms by an internal fluid filled cavity. The other side of this sensing diaphragm is positioned over a cavity which is either evacuated and sealed or, in the second embodiment, vented to the atmosphere. This sensing diaphragm is used to measure either the absolute or gauge pressure of the process fluid. The second sensing diaphragm is connected on one side through a fluid filled cavity to one process diaphragm and on the other side through a second fluid filled cavity to the other process diaphragm. The two fluid filled cavities are essentially isolated from each other. This sensing diaphragm is used to measure the amplitude and frequency of the differential pressure fluctuations caused by the shedding vortices. Either sensing diaphragm can measure the process fluid temperature as well.

In the third embodiment, the sensor element contains a single sensing diaphragm containing piezoresistors arranged in a Wheatstone bridge configuration. This sensing diaphragm is connected to both process diaphragms in the same manner as described above and is used to measure the amplitude and frequency of the differential pressure fluctuations caused by the vortices and is also used to measure the temperature.

In the fourth and fifth embodiments, the sensor contains two sensing diaphragms, used to measure the process fluid pressure and differential pressure fluctuations, that are structured in the same manner as in the aforementioned first and second embodiments and contains an additional sensing element that is not mounted onto a diaphragm. The additional sensing element is the sole means for measuring the process fluid temperature eliminating this measurement from the two sensing diaphragms. The temperature sensing element contains two piezoresistors arranged in a series configuration and are positioned on the front side of the semiconductor chip which is connected to one process diaphragm through a fluid filled cavity.

In the sixth embodiment, the sensor contains one sensing diaphragm, used to measure the differential pressure fluctuations, that is structured in the same manner as in the aforementioned third embodiment and contains an additional sensing element that is not mounted onto a diaphragm. This additional sensing element is the sole means for measuring the process fluid temperature eliminating this measurement from the sensing diaphragm. The temperature sensing element is structured in the same manner as in the aforementioned third embodiment.

In all embodiments, the sensor is fabricated of a polysilicon or silicon semiconductor chip. The chip is bonded to a laminated substrate having circuit traces. Fine wires are connected between the piezoresistors and the circuit traces. In turn, the connection is made from the traces to a multipin hermetically sealed electrical feed through which can either be of glass to metal or ceramic to metal construction. A cable assembly carries the electrical signal from the feed through to the signal processor.

The functionality of the sensor is an improvement over the prior art in that it is capable of making a pressure measurement, a differential pressure amplitude and frequency measurement, and a temperature measurement at a common source point in the same process flow. In addition to these measurements, the computational element derives further measurement quantities indicative of the fluid such as, density, mass flow rate, absolute and kinematic viscosity, and Reynold's number. The ability to compute the Reynold's number is used to improve the flow velocity measurement accuracy.

BRIEF DESCRIPTION OF THE DRAWINGS

The foregoing and other objects, features and advantages of the invention will be apparent from the following more particular description of the preferred embodiments of the invention, as illustrated in the accompanying drawings in which like reference characters refer to the same parts throughout the different views. The drawings are not necessarily to scale, emphasis instead being placed on illustrating the principles of the invention.

DESCRIPTION OF ILLUSTRATED EMBODIMENT

A piezoresistive sensor for use in a vortex flowmeter having multimeasurement capabilities at a common source point within a single process penetration will be described below.

Figure 1:
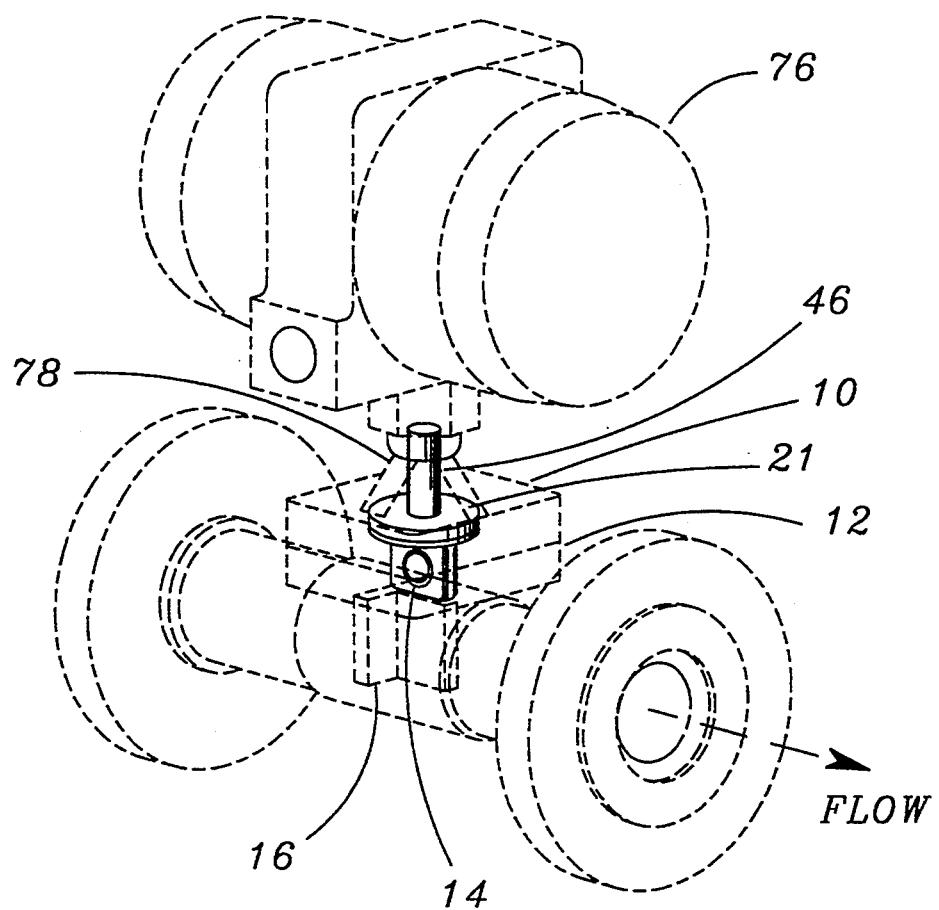
FIG. 1 is a perspective view, partly in phantom, of a vortex flow meter having a flow sensor according to the invention mounted within a flow pipe.

A flowmeter in accordance with the present invention is shown in perspective in FIG. 1.

Figure 2:
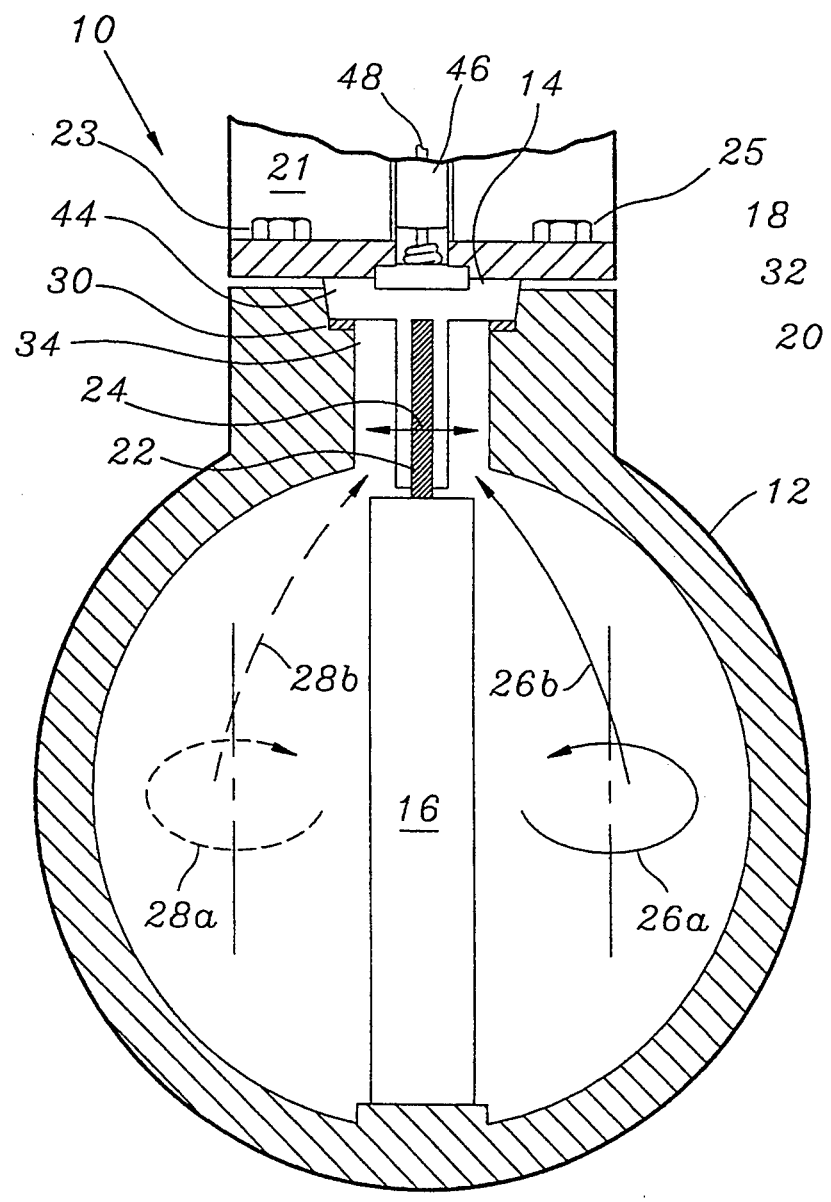
FIG. 2 is a cross-sectional view of a vortex flow meter having a vortex shedder placed in a fluid flow passage for generating alternating vortices and a replaceable vortex sensor constructed according to the principles of this invention.

Referring to FIG. 1 and FIG. 2, the present invention includes a vortex shedding meter 10, which primarily consists of a meter body 12, a sensor 14, a shedder body 16, and signal processing electronics contained in housing 76. The vortex sensor 14 extends through a cylindrical opening 18 of meter body 12 and against vortex shedder 16. Sensor 14 is secured in place by a cap 21 bolted by bolts 23,25 to meter body 12. This construction permits sensor 14 to be easily replaced, if it becomes damaged. Sensor 14 along with gasket 22 divides fluid cavity 20, defined by opening 18, into two halves, pressure chambers 32 and 34. Gasket 22, which is preferably made of suitable high temperature material, creates a pressure seal between the walls of fluid cavity 20 and shedder 16.

Figure 3:
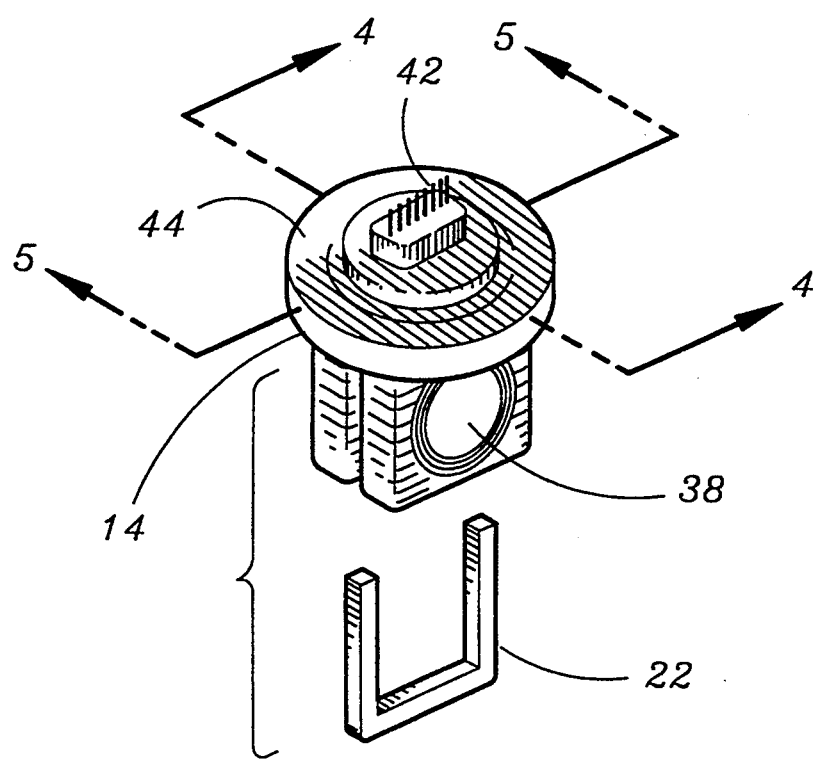
FIG. 3 is a perspective view of the replaceable vortex sensor shown in FIG. 2.

Referring to FIG. 2 and FIG. 3, sensor 14 is mounted between pressure chambers 32 and 34. The sensor is oriented such that its sensing direction is perpendicular to shedder 16 (as indicated by a double headed arrow 24) and along the direction of fluid flowing through meter body 12 (for example into the pipe as shown in FIG. 1). This orientation permits sensor 14 to detect the alternating pressure signals 26b and 28b caused by vortices 26a and 28a. As suggested by solid arrows 26a and 26b and the dashed arrows 28a and 28b, the differential pressure signals are alternately transferred to their respective pressure chambers 32 and 34 and are 180 degrees out of phase with each other. In addition, process fluid pressure and temperature are transferred through the fluid to chambers 32 and 34 as well. A second gasket 30, preferably made of high-temperature material, is secured between sensor 14 and meter body 12 to prevent external leakage of fluid.

Figure 4:
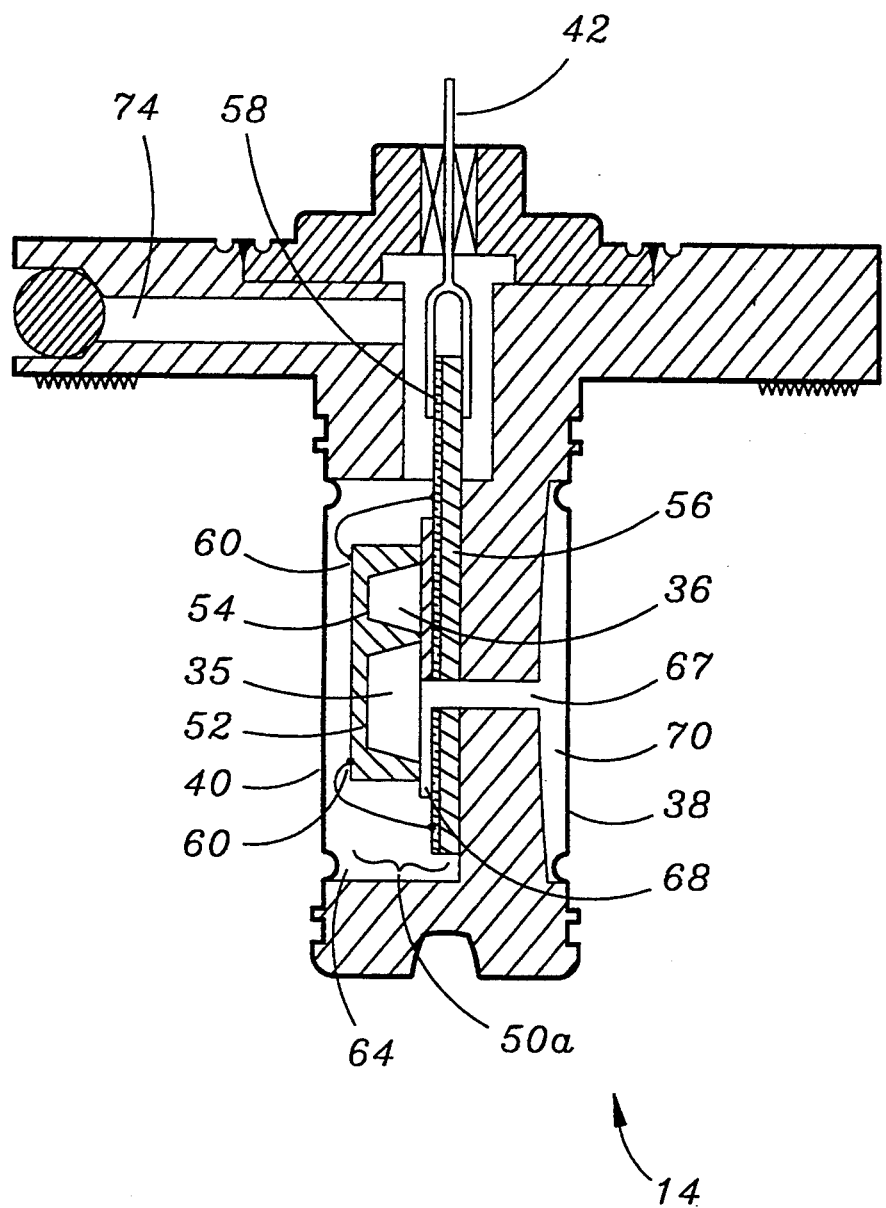
FIG. 4 is an enlarged cross-sectional view of the vortex sensor taken along section 4—4 in FIG. 3.

Referring to FIG. 3 and FIG. 4, sensor 14 is generally rectangular in shape and is fitted with flexible metal process diaphragms 38 and 40 respectively facing pressure chambers 32, 34 (see FIG. 2) used to isolate transducer 50a from direct contact with the process fluid and to transmit differential pressure fluctuations, pressure and temperature to transducer 50a.

Referring to FIG. 2 and FIG. 3, secured to the upper part of the sensor 14 is a round sealing flange 44 carrying an electrical feed through fitting 42. A rigid tube 46 is welded to this fitting to provide protection for the connection elements (not shown) used to bring the electrical signals out from the sensor to cable assembly 48. This cable leads to a processing element 82 (see FIG. 8) found in instrument housing 76 (see FIG. 1), which functions in a known manner to produce conventional measurement signals 84 (see FIG. 8) adapted for use in industrial process control. In the preferred embodiment, fitting 42 is a hermetic multipin feed through plug making sensor 14 a self-contained unit and easily removable for calibration, replacement, cleaning or the like.

Figure 5:
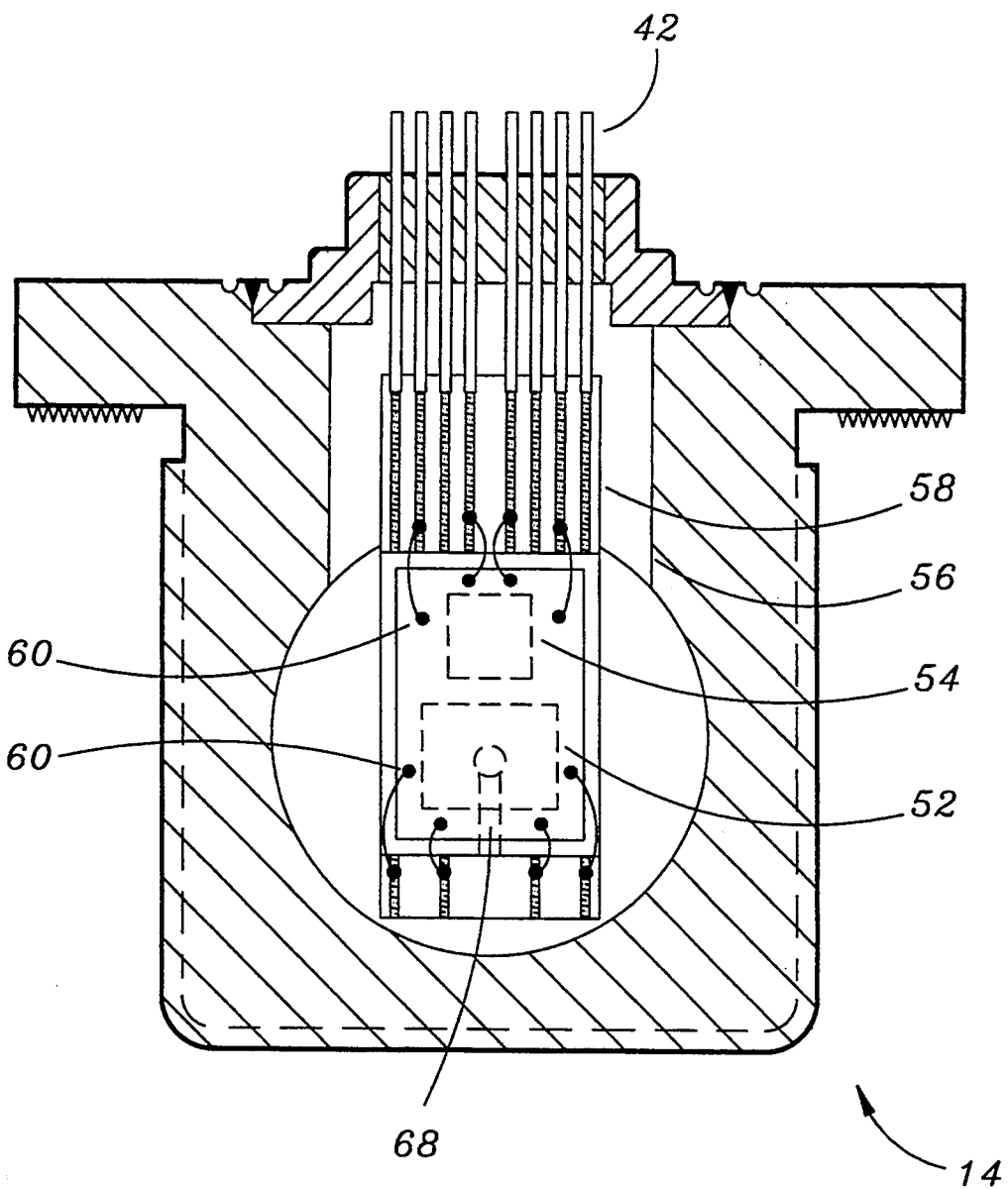
FIG. 5 is an enlarged cross-sectional view of the vortex sensor taken along section 5—5 in FIG. 3.

FIGS. 4 and 5 provide more detailed views of sensor 14. Between process diaphragms 38 and 40 is cavity 64 within which is positioned sensing transducer 50a which is used to detect the pressure fluctuations of the vortices as well as the pressure and temperature of the fluid. The sensing transducer is a rectangular semiconductor chip fabricated of a polysilicon or silicon material. Other geometric shapes can be used in accord with the invention, provided that at least one side of the chip is substantially flat. Sensing transducer 50a contains two sensing diaphragms 52 and 54 used to produce electric output signals responsive to differential pressure fluctuations, pressure, and temperature. Sensing diaphragms 52,54 are mounted onto laminated substrate 56. Laminated substrate 56 contains a layer of conductive traces 58 for transmitting output signals from the sensing diaphragms. Sensing transducer 50a is connected by multiple electrical wires 60 which are mounted from the outer edges of the sensing transducer to the layer of conductive traces 58. Details as to the further construction of the laminated substrate and the electrical connections from the sensing transducer to the laminated substrate are found in U.S. Pat. application Ser. No. 825,620 whose disclosure is hereby incorporated by reference.

Referring to FIGS. 4 and 5, sensor 14 contains a fill port 74 for importing a non-corrosive inert fill fluid. The fill fluid enters through fill port 74 fills cavity 64 passes through a narrow slit 68 and fills cavity 35. It then fills bore 67 and cavity 70. Slit 68 establishes high mechanical or hydraulic impedance between cavity 64 and cavity 70. The fill path accordingly does not reduce the differential pressure fluctuations experienced by sensing diaphragm 52 relative to the differential pressure at process diaphragms 38,40, except at frequencies lower than those encountered during normal vortex-sensing operation. The fill fluid on both sides of sensing transducer 50a serves to transmit to sensing diaphragms 52,54 the pressure fluctuations, process fluid pressure and temperature applied to the outer surfaces of process diaphragms 38,40 by the passage of the process fluid and vortices shed by shedder body 16. The fill fluid provides a desirably benign environment for sensing transducer 50a by protecting it from hostile fluids.

Slit 68 is large enough to allow fill fluid to seep therethrough yet small enough to form an apparent pressure barrier between cavity 64 and cavity 70. The slit is dimensioned to present a relatively high hydraulic impedance at the vortex frequencies being measured. Further, unequal pressure build-up within the hydraulic fluid on either side of sensing transducer 50a, as a result of temperature variations, is equalized by the passage of fluid from one compartment to another through slit 68.

Referring to FIG. 4, sensing diaphragm 52 senses the alternating differential pressure of the fluid flow and produces a corresponding electrical signal. Sensing diaphragm 54 senses the process fluid pressure and produces a corresponding electric signal. Either diaphragm 52 or 54 can be used to sense the process fluid temperature. Sensing diaphragms 52, 54 are formed of the same substantially flat face of a diaphragm chip, preferably fabricated of a polysilicon or silicon material. Piezoresistive strain gauges are disposed on each sensing diaphragm in a Wheatstone bridge configuration (see FIG. 7). Additionally, a dielectric layer can be interposed between the silicon or polysilicon diaphragm and the piezoresistors. This electrically isolates the resistors minimizing both unwanted leakage currents and resistance degradation at high process fluid temperature.

Figure 7:
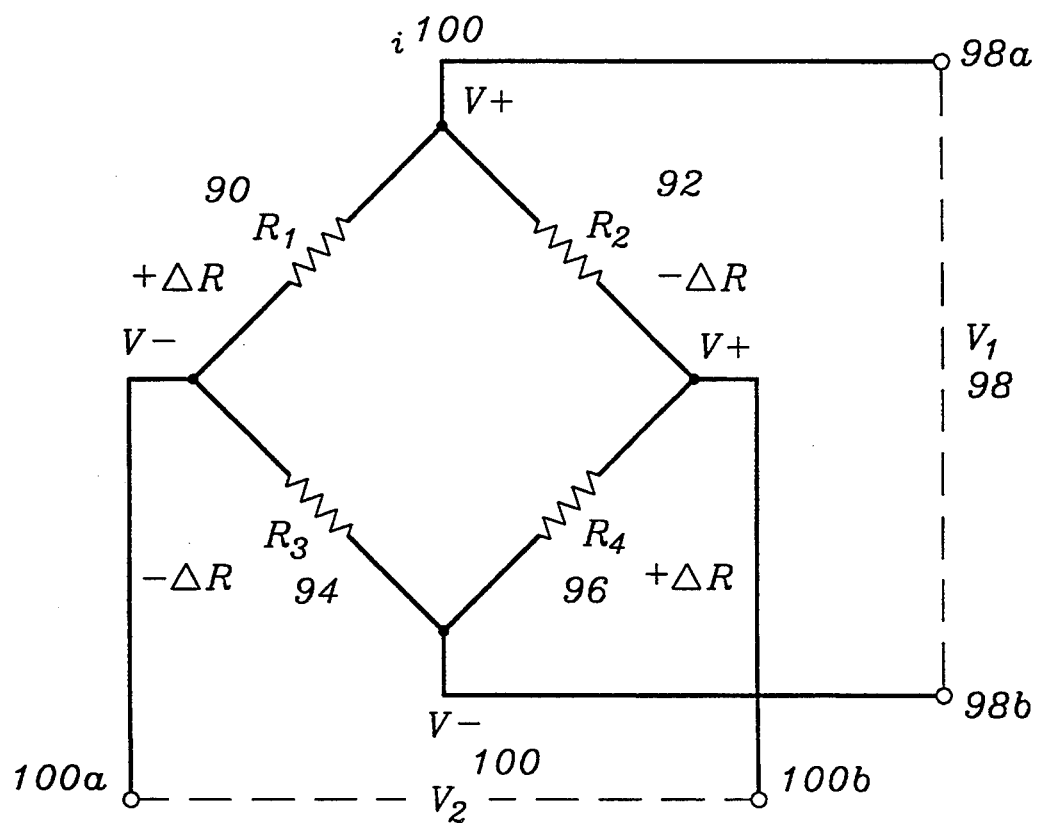
FIG. 7 is a schematic diagram of the coupling of the sensing resistors in a Wheatstone bridge configuration according to the present invention.

Referring to FIG. 7, Wheatstone bridge 88 consisting of four piezoresistor elements is positioned on the front face of sensing diaphragms 52, 54. The four piezoresistors 90, 92, 94, 96 are positioned on each sensing diaphragm such that when they are subject to movement of the sensing diaphragms due to pressure, piezoresistors 90, and 96 both experience either a compressive or a tensile strain while piezoresistors 92 and 94 simultaneously experience the opposite strain. Thus, if piezoresistors 92 and 94 are increasing in resistance, then piezoresistors 90 and 96 are decreasing in resistance. This in turn creates an imbalance across the bridge such that when current 102 passes through the bridge from terminal 98a to 98b, a voltage V2 occurs across terminals 100a, 100b which is related to the movement of the diaphragm relative to the pressure being sensed as discussed below.

The temperature measurement is also made from piezoresistor elements. The value of the resistance of piezoresistors 90, 92, 94, 96 is a function of temperature. When constant drive current 102 is supplied to the Wheatstone bridge circuit, the voltage across drive terminals 98a, 98b is related to the equivalent resistance of the series-parallel combination of the four resistors between the drive terminals as discussed below. The equivalent resistance is primarily a function of temperature and, hence, used to compute the temperature.

Referring again to FIGS. 4 and 5, sensing diaphragm 52 has a reverse side with cavity 35 which is fluid filled. The fill fluid serves to transmit to the sensing diaphragm the pressure fluctuations applied to the process diaphragms by the passage of the vortices shed by shedder bar 16. Sensing diaphragm 52 deflects due to the differential pressure transmitted through the fill fluid from process diaphragms 38, 40 produced by the alternating vortices. Such deflection causes a change in resistance which is detected by the internal Wheatstone bridge circuit producing a corresponding electric output signal. The output signal is transmitted to a processing element 82 (see FIG. 8) which determines the amplitude and frequency of the signal which is used to compute the fluid velocity and density.

Figure 6:
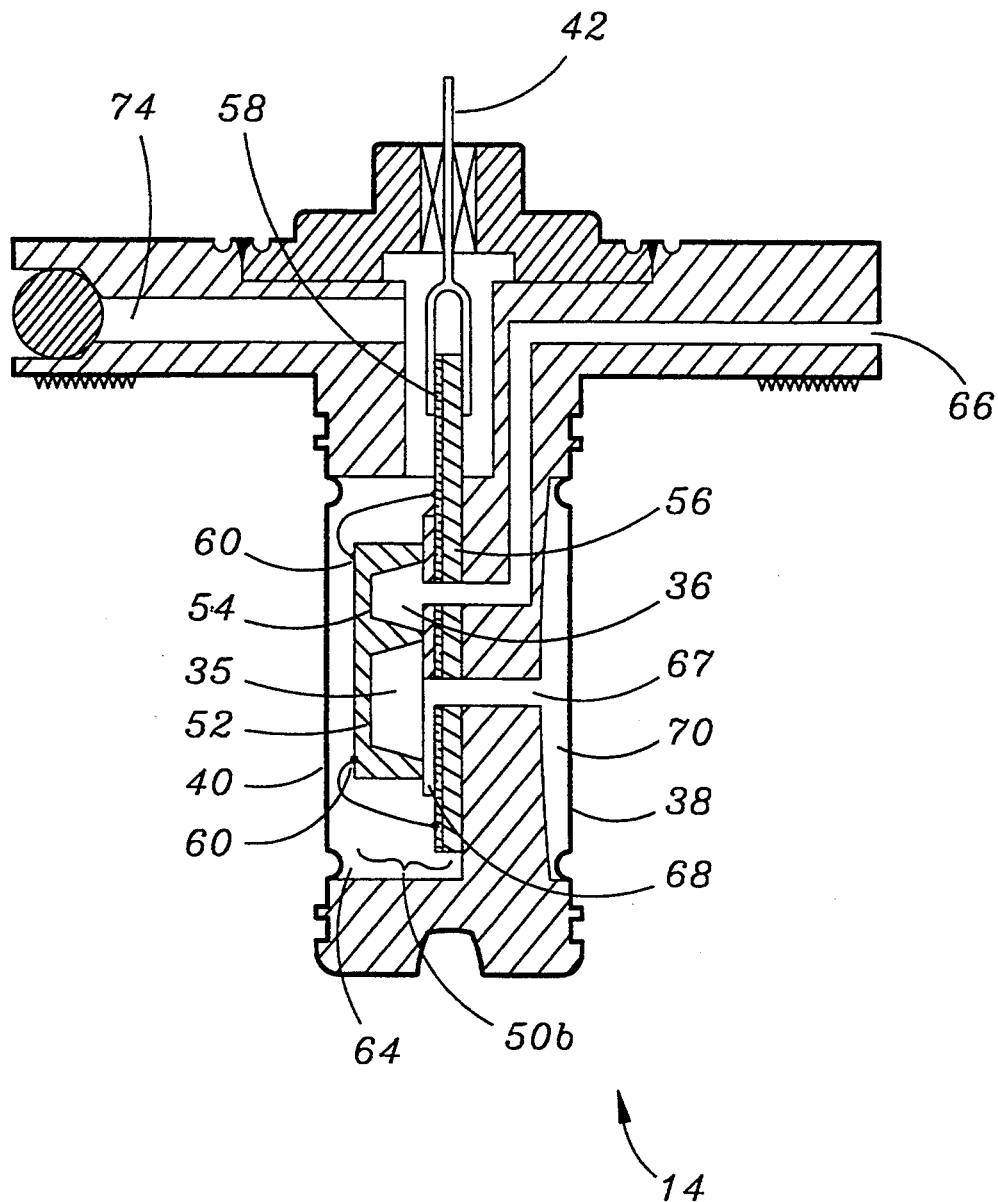
FIG. 6 is an enlarged cross sectional view of a second embodiment of the vortex sensor taken along section 4—4 in FIG. 3.

Sensing diaphragm 54 is used to measure the absolute or gauge pressure of the process fluid. Sensing diaphragm 54 has a reverse side with sealed cavity 36 which is vacuum-filled when used to measure absolute pressure. In the second embodiment, for a gauge pressure measurement, cavity 36 is vented to the atmosphere through atmosphere vent 66 (see FIG. 6). In sensing diaphragm 54, the deflection of the diaphragm due to pressure creates a change in resistance which is detected by the internal Wheatstone bridge circuit producing a corresponding electric output signal. In addition, sensing diaphragm 54 also deflects due to the pressure fluctuations generated by the vortices affecting process diaphragm 40. This deflection also creates a change in resistance which is detected by the internal Wheatstone bridge circuit. The resultant voltage output of the bridge is therefore a composite of the fluid pressure with a smaller a.c. component superimposed on it. The fluid pressure can be anywhere from approximately 20 psi to 2000 psi while the alternating differential pressure caused by the vortices can vary from approximately 0.01 psi to 15 psi. The processor element computes the average fluid pressure from this composite signal.

Additionally, either sensing diaphragms 52 or 54 can be used to measure the temperature of the fluid. The temperature of the fluid is sensed by the piezoresistor element in sensing diaphragms 52,54 which produces a corresponding output signal. The temperature measurement is also used to compensate, in processing element 82, for repeatable errors in the measurement of pressure and differential pressure caused by widely varying temperatures.

Figure 9:
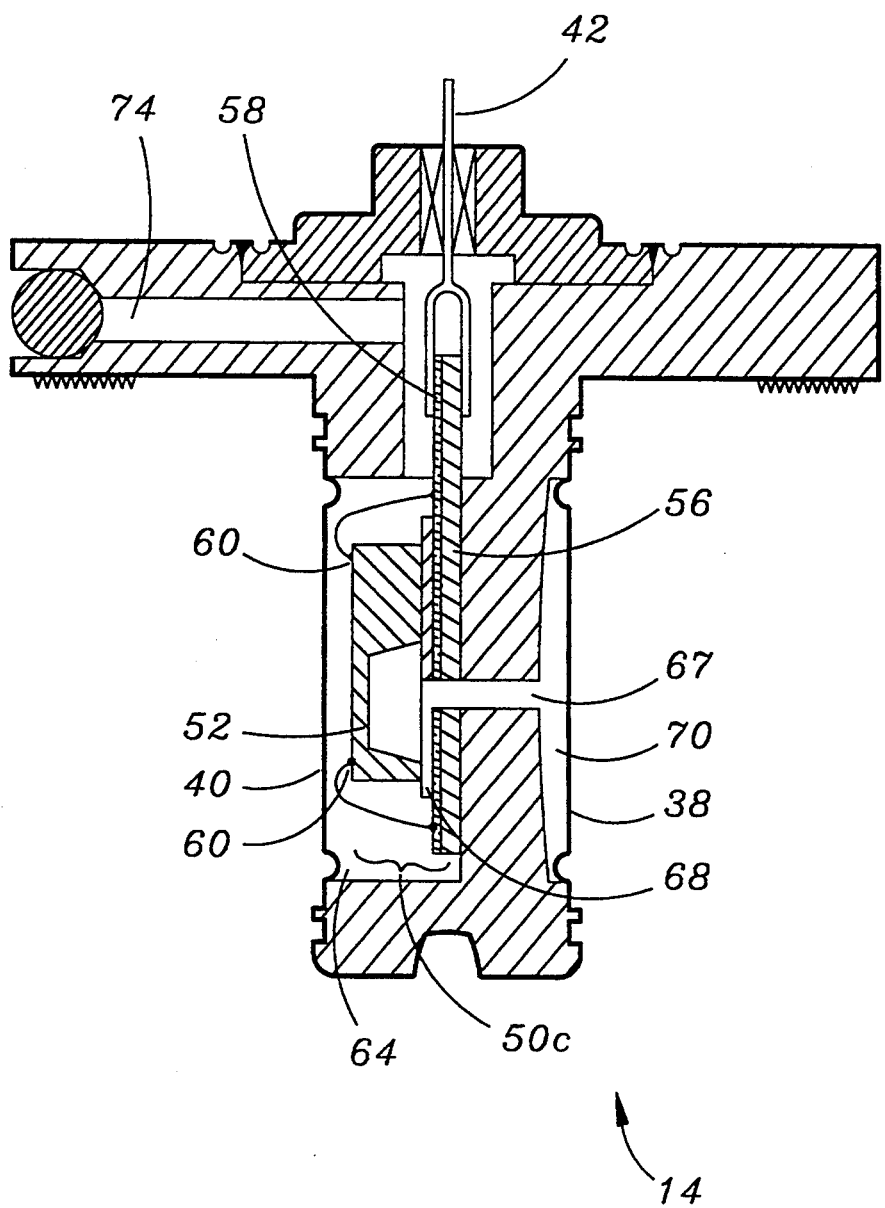
FIG. 9 is a cross sectional view of a third embodiment of the vortex sensor taken along section 4—4 in FIG. 3.

FIG. 9 depicts the third embodiment of the invention. In the third embodiment, sensing transducer 50c consists of sensing diaphragm 52 used to produce electric output signals responsive to differential pressure fluctuations and temperature. Sensing diaphragm 52 used within sensing transducer 50c, in this embodiment, is similar in all other structural and operational details to the first embodiment.

Figure 10:
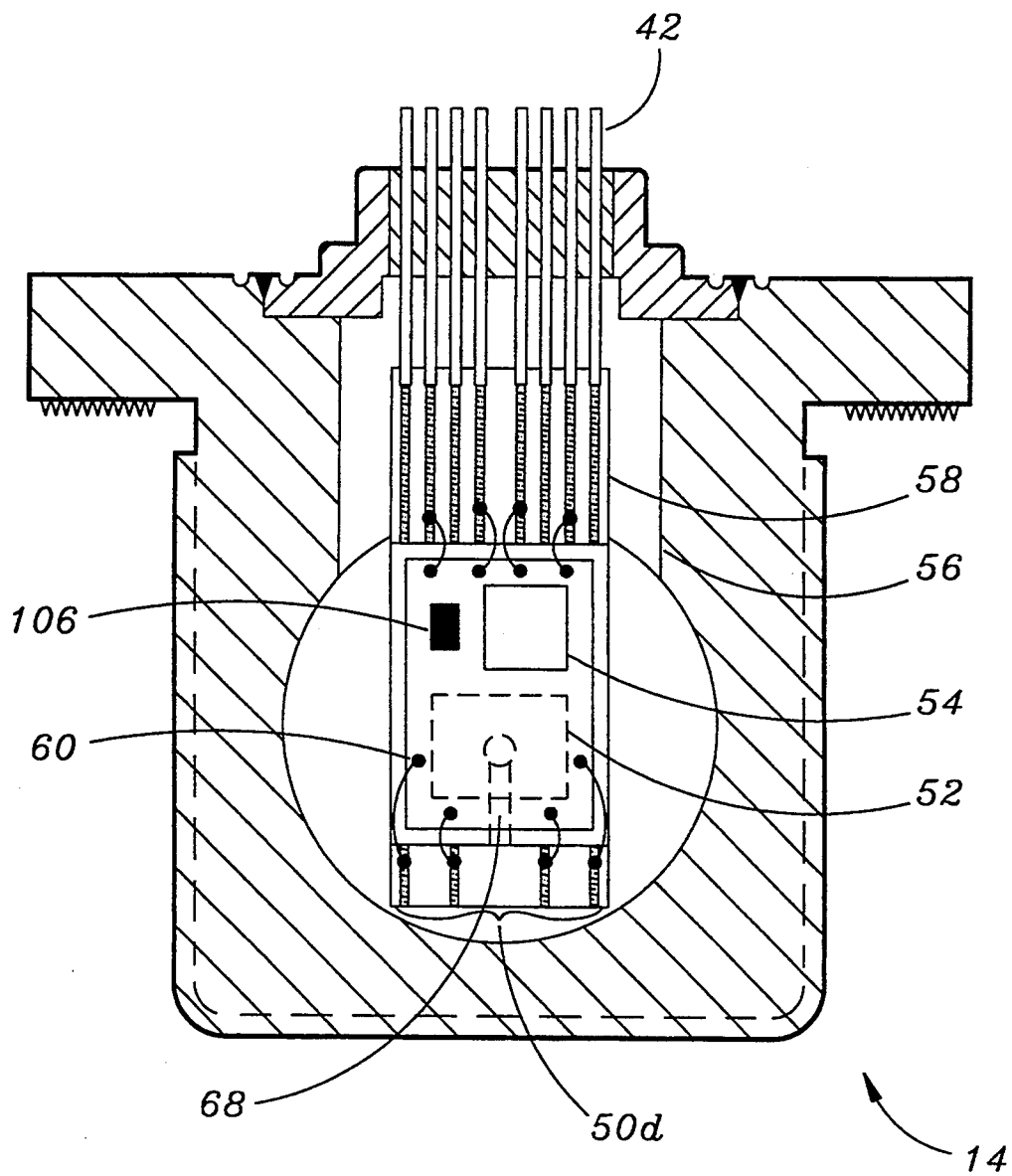
FIG. 10 is a cross sectional view of a fourth embodiment of the vortex sensor taken along section 5—5 in FIG. 3.
Figure 11:
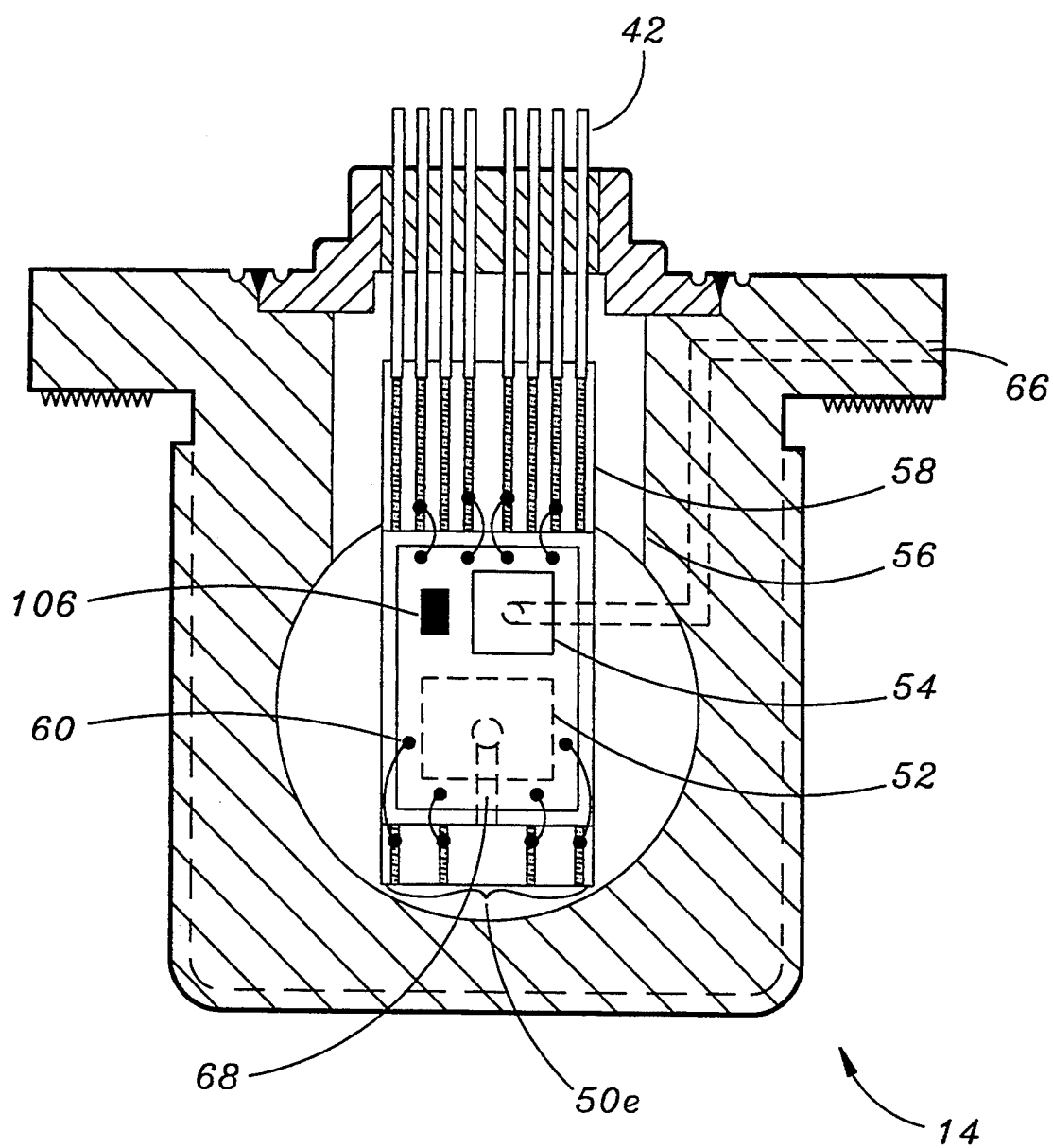
FIG. 11 is a cross sectional view of a fifth embodiment of the vortex sensor taken along section 5—5 in FIG. 3.

FIG. 10 depicts the fourth embodiment of the invention. In the fourth embodiment, sensing transducer 50d consists of two sensing diaphragms, 52 and 54, and sensing element 106. Sensing diaphragm 52 is used to measure the alternating differential pressure of the fluid flow and sensing diaphragm 54 measures the absolute pressure of the process fluid as detailed above in the first embodiment and similar to FIG. 4. Sensing element 106 is used solely to measure the temperature of the process fluid. Neither sensing diaphragm 52 nor 54 is used to measure the process fluid temperature. The fifth embodiment, as shown in FIG. 11, is similar to the fourth embodiment, except that sensing diaphragm 54 is vented to the atmosphere measuring gauge pressure in a similar manner as in the second embodiment and shown in FIG. 6.

Figure 13:
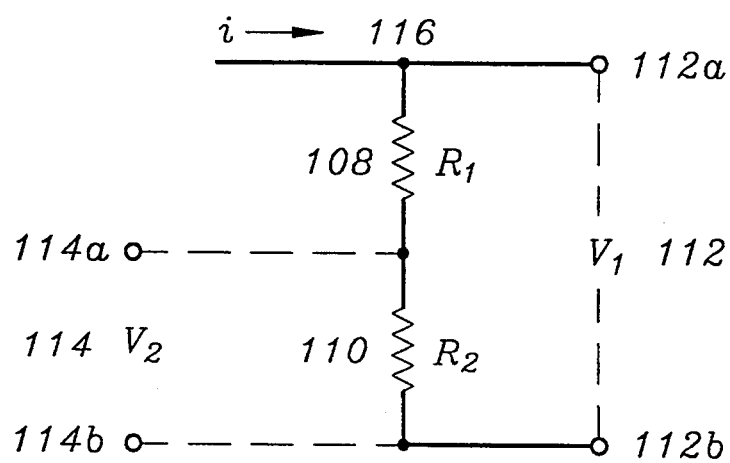
FIG. 13 is a schematic diagram of the coupling of the sensing resistors in a series configuration according to the fifth and sixth embodiments of the present invention.

The fourth and fifth embodiments are particularly suited to polysilicon sensors, however, they can also be used with silicon sensors. Impurity doped polysilicon resistors have a very low temperature coefficient compared to silicon. To achieve an accurate temperature measurement, it is therefore highly desirable to physically isolate the temperature sensor from the mechanical strains experienced by the pressure sensing diaphragms. Referring to FIG. 13, sensing element 106 consists of two piezoresistor elements 108 and 110 arranged in a series configuration and used as a voltage divider. Piezoresistor elements 108, 110 are doped such that they have different temperature coefficients, preferably one with a negative and the other with a positive resistance temperature coefficient. The ratio of the voltages V1/V2 is a function of temperature.

Figure 12:
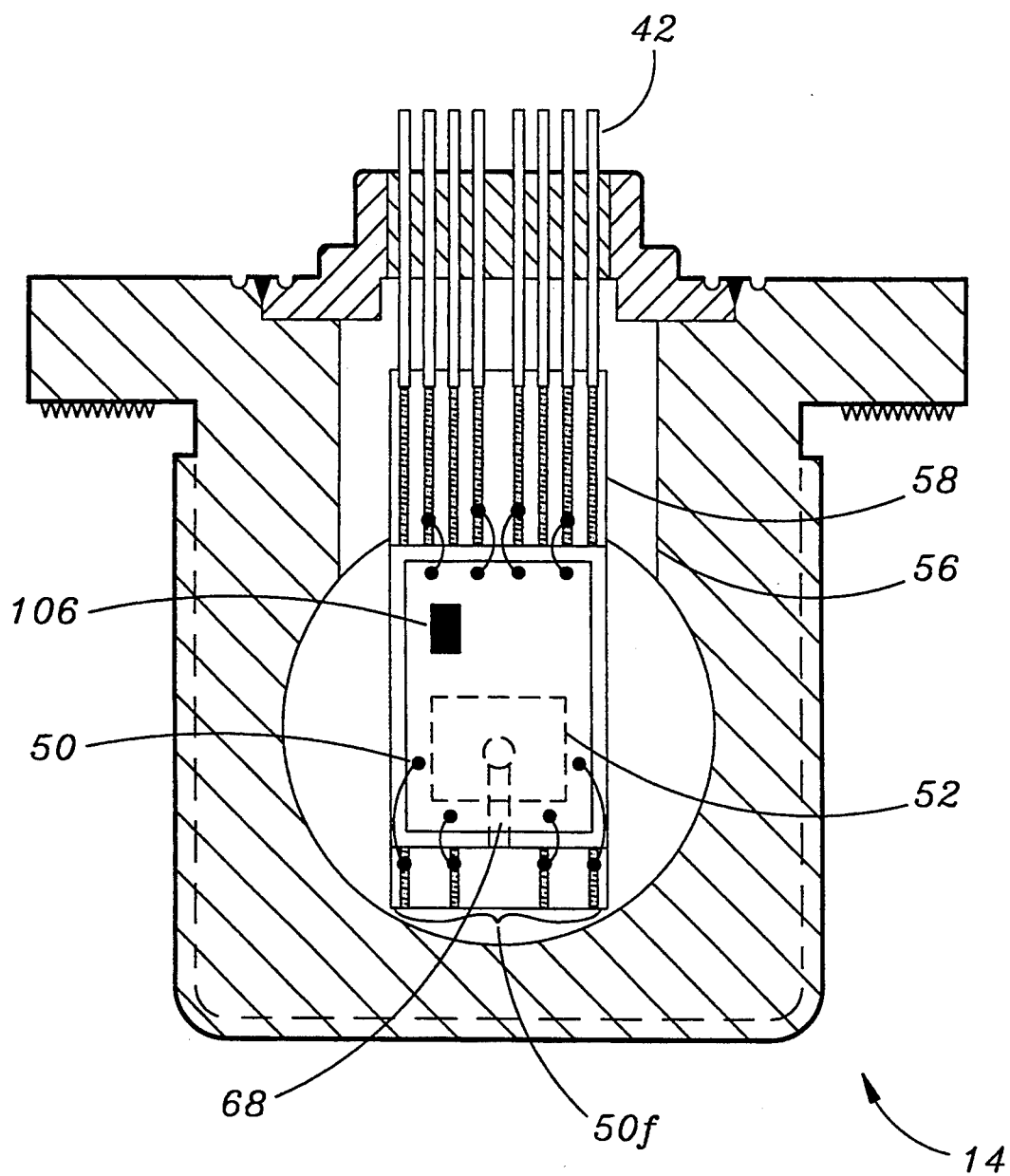
FIG. 12 is a cross sectional view of a sixth embodiment of the vortex sensor taken along section 5—5 of FIG. 3.

FIG. 12 depicts a sixth embodiment of this invention where sensing transducer 50f comprises sensing diaphragm 52, used to measure the differential pressure fluctuations solely, and sensing element 106 which is used to measure temperature. As in the fourth and fifth embodiments, this embodiment is particularly suited to polysilicon sensors for the aforementioned reasons and could also be used with silicon.

A sensor designed in this fashion has the advantage of providing a more accurate temperature measurement since sensing element 106 is totally insensitive to mechanical strains thereby being unaffected by the differential pressure fluctuations or process fluid pressure. In the case where sensing transducer 50d, 50e, 50f is fabricated from a polysilicon semiconductor chip, it is imperative that the temperature measurement be made in this fashion in order to obtain an accurate measurement. Polysilicon resistors have a low resistance temperature coefficient making it difficult to isolate the temperature effect when in combination with the effect of the differential or process fluid pressure.

The active or moving parts of sensor 14, namely, sensing diaphragms 52, 54, process diaphragms 38, 40, and the fill fluid have very low mass. Also, sensing diaphragms 52, 54 are extremely stiff. A sensor constructed in this manner has two advantages. It is inherently insensitive to mechanical vibrations such as lateral pipe vibrations. Secondly, it has a resonant frequency which is substantially higher than vibration frequencies which are typically experienced in piping, and is also substantially higher than the maximum shedding frequency. Therefore measurement errors caused by exciting the sensor at resonance do not occur, nor does the sensor fatigue due to excessive motion at resonance.

Figure 8:
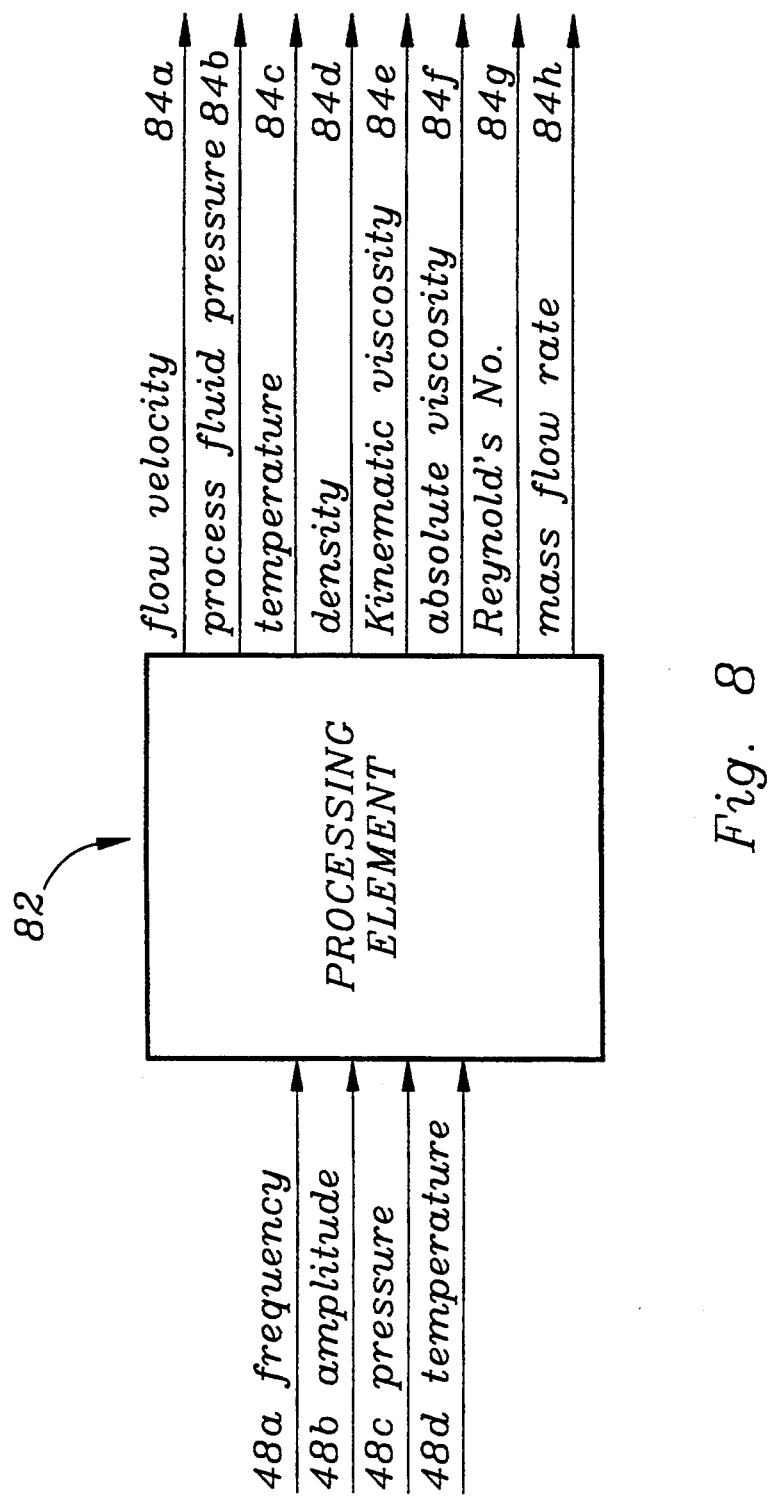
FIG. 8 is a block diagram showing the processing element and its inputs and outputs as used in this invention.

Referring to FIGS. 1 and 8, instrument housing 76 coupled by support member 78 to meter body 12 contains processing element 82 used to produce measurement signals 84 derived from signals transmitted from sensor 14 transmitted through cable 48. The processing element is a microprocessor, however, the invention is not limited to this use, other types of processing elements may be used.

Referring to FIG. 8, processing element 82 receives input signals 49 which are transmitted from sensor 14. Input signals 49 indicate the frequency and amplitude of the differential pressure fluctuations, temperature and pressure of the fluid's flow. From input signals 47, processing element 82 computes additional physical characteristics of the fluid's flow. These physical characteristics include, but are not limited to, the fluid's velocity, density, viscosity, Reynold's number, and mass flow rate. Details as to how these computations are derived are described below. These additional measurement quantities are transmitted from processing element 82 through measurement signals 84 for use in an industrial process control system.

The operation of the vortex flow meter and sensor will now be described in detail. When the process fluid flows through the flow pipe, vortices are generated by shedder 16 which in turn generates the alternating vortex pressure fluctuations. These pressure fluctuations as well as the fluid pressure and temperature are transmitted through pressure chambers 32, 34 to sensor 14. Process diaphragms 38,40 serve to isolate the process fluid from the sensing transducer while transmitting the alternating vortex pressure fluctuations, pressure, and temperature of the fluid through the fill fluid to sensing diaphragms 52, 54.

The alternating vortices cause pressure fluctuations which are transmitted through the fill fluid on both sides of sensing diaphragm 52 causing it to deflect in response to the resultant alternating pressure. As a result the piezoresistors in sensing diaphragm 52 experience an alternating strain resulting in a sinusoidal variation in resistance producing an a.c. voltage signal. This signal is transmitted from sensing diaphragm 52 through conductive traces 58 through fitting 42 to cable 48 and onto processing element 82. This a.c. voltage signal will be sinusoidal in nature from which its frequency and amplitude is computed in known fashion by processing element 82. Since sensing diaphragm 52 only senses differential pressure and is relatively immune to fluid pressure, sensor 14 has excellent inherent common mode noise rejection and immunity to pump pulsations. Therefore, there is little possibility that processing element 82 will interpret pump pulsations as being vortex shedding pressure fluctuations and compute an erroneous flow velocity.

The alternating pressure caused by the vortex shedding is transmitted from process diaphragms 38, 40 through the fill fluid to the two sides of sensing diaphragm 52. The process fluid pressure is transferred from process diaphragm 40 through the fill fluid to the top side of sensing diaphragm 54. Typically the amplitude of the alternating differential pressure is between $+/-0.02$ psi to $+/-15$ psi depending on the flow velocity and the process fluid density. The process fluid pressure might be anywhere from 20 psig to 2000 psig. Therefore, the pressure experienced by sensing diaphragm 54 is largely the process fluid pressure which is basically steady, plus a smaller sinusoidal component caused by the shedding vortices. The processing electronics extracts the average pressure.

Independently, a temperature measurement is made as well from sensing diaphragms 52 or 54. There is a constant drive current applied to the Wheatstone bridge circuit at terminal 102. The temperature measurement is made by measuring the voltage across drive terminals 98a, 98b at a constant drive current. The voltage from drive terminals 98a, 98b produces a resultant d.c. voltage indicative of the temperature of the fluid. In the preferred embodiment, the temperature measurement is made from either sensing diaphragms 52 or 54. However, this invention is not limited to this embodiment. In alternative embodiments, the temperature measurement can be made from either one of the sensing diaphragms or from a third location on the semiconductor chip having piezoresistors but no diaphragm.

In the fourth, fifth,and sixth embodiments, the process fluid temperature measurement is made from two piezoresistors, 108, 110 arranged in a series configuration situated on the front face of the semiconductor chip subjected to the process fluid temperature from process diaphragm 40. A current is applied to piezoresistors 108, 110 at terminal 116. The temperature measurement is made by measuring the voltage across terminals 112a and 112b in proportion to the voltage across terminals 114a and 114b as described in detail below.

Hence, the outputs from sensor 14 are electronic signals indicative of the frequency and differential pressure amplitude of the shedding vortices, the fluid's gauge or absolute pressure, P, and the temperature, T. These and other measurements are computed by processing element 82 as follows:

1. The flow velocity, Vf, is computed from the following relation:

$$Vf = C_1 * fs,$$

where $C_1$ is a known calibration constant which is a function of the flowmeter internal diameter and the shedder bar geometry and
fs is the vortex shedding frequency.

2. The temperature measurement, T, made in the first and second embodiments is primarily a function of the voltage V1 across drive terminals 98a, 98b (see FIG. 7) of the Wheatstone bridge which in turn is proportional to the equivalent resistance at these terminals. The equivalent resistance is also affected somewhat by the pressure if sensing diaphragm 54 is used to measure temperature, or by the differential pressure if sensing diaphragm 52 is used to measure temperature. Thus at a constant drive current, the temperature is computed from an equation of the general form:

$$T = \sum_{q=0}^{q} \sum_{r=0}^{r} a_{qr} V_1^q V_2^r$$

where $a_{qr}$ are calibration constants and
$V_1$, $V_2$ are measured voltages.

3. The alternative temperature measurement, T, made in the fourth, fifth, and sixth embodiments is in proportion to voltages 112 and 114 across piezoresistors 108, 110. Piezoresistors 108 and 110 are such that they have different temperature coefficients. This measurement, unlike the temperature measurement above, is not affected by the process fluid pressure or differential pressure fluctuations. The general form of the temperature measurement is computed from the following relation:

$$T = 1 + A_1 (V_1/V_2) + A_2 (V_1/V_2)^2 + \ldots + A_n (V_1/V_2)^n$$

where $V_1$ and $V_2$ are the measured voltages and
$A_1, A_2, \ldots, A_n$ are calibration constants.

4. The pressure measurement, P, is primarily a function of the voltage V2 across terminals 100a, 100b of the bridge circuit on sensing diaphragm 54 (see FIG. 7). The measurement is slightly affected by the temperature of the sensing diaphragm. Thus, at a constant drive current, the pressure is computed from an equation of the following general form:

$$P = \sum_{n=0}^{n} \sum_{m=0}^{m} b_{nm} V_1^n V_2^m$$

where $b_{nm}$ are calibration constants and
$V_1$, $V_2$ are the measured voltages.

5. Similarly the measurement of the amplitude of the alternating differential pressure is primarily a function of the voltage V2 across terminals 100a and 100b of the bridge circuit on sensing diaphragm 52 (see FIG. 7). This measurement is also affected by the temperature of the sensing diaphragm. Thus, at a constant drive current, the differential pressure is computed from an equation of the same general form as the pressure discussed in 4 above.

6. The process fluid density, d, can be computed by the following relations for the sensor described in the first, second, fourth, and fifth embodiments of the invention as follows:

a) For an ideal gas, $d = P/(R * T)$, where R is the known gas constant and P and T are the measured pressure and temperature signals computed as shown in (2), (3), and (4).

b) For a liquid, $d = d_0, (1 + B_1, (P - P_a))/(1 + B_2 * (T - T_0))$ where $T_0$ is a reference temperature, $P_a$ is a reference pressure, $d_0$ is the density at reference temperature $T_0$ and reference pressure $P_a$, $B_1$ and $B_2$ are known compressibility and expansion factors, and P and T are the pressure and temperature computed as shown in (2), (3), and (4).

7. An alternative method for computing the process fluid density, d, for any embodiment is from the average alternating differential pressure created by the shedding vortices across the sensor and the flow velocity measurement. This relation is as follows:

$d = $ differential pressure$/(C_2 * Vf^2)$, where $C_2$ is a known constant and Vf is computed as shown in (1) above.

8. A computation of the expected sensor signal V2 across terminals 100a, 100b of the bridge circuit of the differential pressure sensing diaphragm 52 can be used as a diagnostic to determine whether the sensor and its associated electronics are functioning correctly. The expected signal V2 is proportional to the product of the fluid density times the flow velocity squared. For example, if the fluid density is computed as in 6a or 6b and the flow velocity is computed as in 1 above, then the expected signal is:

$$V2 = C_3 * d * Vf^2$$

where $C_3$ is a calibration constant.

9. The absolute viscosity v of the process fluid is a function of the process fluid temperature and is computed from the relationship between the temperature and absolute viscosity, which must be known for the particular process fluid.

10. The kinematic viscosity, kv, of the fluid is determined from the following relation:

$kv = v/d$, where v is the absolute viscosity computed as shown in (9) above and d is the density computed as shown from (6) or (7) above.

11. The Reynold's number, R, is determined from the following relation:

$R = (Vf * D)/kv$, where Vf is the velocity computed as shown in (1), D is the flowmeter internal diameter, and kv is the kinematic viscosity computed as shown in (10) above.

11. The accuracy of the flow velocity computation can be improved if the Reynold's number is known. This is due to the fact that the shedder bar geometry $C_1$ is not constant, rather varies in a known fashion with the Reynold's number.

12. The mass flow rate of both liquids and gases is determined from the following relation:

$MFR = d * a * Vf$, where d is the density computed as shown in (6) and (7) above, Vf is the flow velocity computed as shown in (1), and a is the area of the flowmeter bore.

The multimeasurement capabilities described above are attributable to the properties of the piezoresistor element. Piezoresistors can be applied to measure a.c. pressure fluctuations which are generated by vortex shedding as well as the process fluid's pressure and temperature which are often quite steady. This is an improvement over the prior art which employed piezoelectric crystals which had by their nature the limited capability of being able to measure only a.c. pressure fluctuations.

Additionally, this invention is a beneficial improvement since it has the capability to measure in a single flow penetration the fluid's differential pressure, temperature, and pressure from which other physical characteristics of the flow can be computed. Such other characteristics include, but are not limited to, the density of the fluid, the absolute viscosity, the Reynold's number, and the mass flow rate. There is also the additional benefit of an increased accuracy in the measurements since they were measured from a common sampling point.

While the foregoing description of the preferred embodiments have considered resistive sensing other known sensing techniques can be used. For example, conventional resistance strain gauges, capacitance sensing, or optical sensing may be employed in lieu of the piezoresistor sensing techniques used in this invention.

Although preferred embodiments of the invention have been described hereinabove in detail, it is desired to emphasize that this is for the purpose of illustrating the invention and thereby to enable those skilled in this art to adapt the invention to various different applications requiring modifications to the apparatus described hereinabove; thus, the specific details of the disclosures herein are not intended to be necessary limitations on the scope of the present invention other than as required by the prior art pertinent to this invention.

I claim:

1. A flow-metering apparatus of the vortex-generating type comprising:

a) a flow-pipe section adapted to be coupled into a fluid flow conduit;

b) a vortex-generating body mounted in said flow-pipe section for generating alternating differential pressure fluctuations;

c) a sensor housing providing sealed interior spaces and fluidly Connected to said fluid flow;

d) first and second process diaphragm means forming part of said sensor housing to contact the flowing fluid and to transmit into said sealed interior spaces said alternating differential pressure fluctuations and fluid temperature;

e) sensor means located inside of said sensor housing having opposite sides subjected respectively to said pressure fluctuations and temperature changes from said first and second process diaphragms, said sensor means used to detect said pressure fluctuations and said temperature changes of said fluid flow;

f) liquid fill in said sealed interior spaces surrounding said sensor means for transmitting within said sealed interior spaces said pressure fluctuations and fluid temperature applied through said process diaphragms;

g) electrical transmission means connected to said sensor means to conduct signals corresponding to changes in said pressure fluctuations and fluid temperature; and h) computation means connected to said electrical transmission means used to process output signals transmitted from said electrical transmission means and used to produce electronic signals indicative of physical measurement quantities of the flow.

2. Apparatus as in claim 1, where said sensor means comprises of a first sensing diaphragm for detecting said pressure fluctuations and temperature changes having opposite sides subjected respectively to said pressure fluctuations and temperature changes from said first and second process diaphragms.

3. Apparatus as in claim 1, where said sensor means comprises of a first sensing diaphragm and a first sensing element such that said first sensing diaphragm is used to detect pressure fluctuations and has opposite sides subjected respectively to said pressure fluctuations from said first and second process diaphragms and said first sensing element is used to detect temperature changes being spaced from said first sensing diaphragm and having a single side subjected to said temperature changes from said first process diaphragm.

4. Apparatus as in claim 1, wherein said sensor means comprises a sensor body located outside of said flow-pipe section but fluidly connected thereto.

5. Apparatus as in claim 1, in which said sensor means is fabricated from the group consisting of a polysilicon semiconductor chip or a silicon semiconductor chip.

6. Apparatus as in claim 1, in which said sensor means contains a resistive element for sensing changes due to said pressure fluctuations and temperature changes.

7. A flow-metering apparatus of the vortex-generating type comprising:

a) a flow-pipe section adapted to be coupled into a fluid conduit flow;

b) a vortex-generating body mounted in said flow-pipe section for generating alternating differential pressured fluctuations;

c) a sensor housing providing sealed interior spaces and fluidly connected to said fluid flow;

d) first and second process diaphragm means forming part of said housing to contact the flowing fluid and to transmit into said sealed interior spaces said alternating differential pressure fluctuations, process fluid pressure and temperature of the fluid;

e) sensor means located inside of said sensor housing having opposite sides subjected respectively to said pressure fluctuations, process fluid pressure, and temperature changes from said first and second process diaphragms, said sensor means used to detect said pressure fluctuations, process fluid pressure, and temperature changes;

f) liquid fill in said sealed spaces surrounding said sensor means for transmitting within said sealed interior spaces said pressure fluctuations, process fluid pressure, and temperature applied through said process diaphragms;

g) electrical transmission means connected to said sensor means to conduct signals corresponding to said pressure fluctuations, process fluid pressure, and temperature; and h) computation means connected to said electrical transmission means used to process output signals transmitted from said electrical transmission means and used to produce electronic signals indicative of physical measurement quantities of the flow.

8. Apparatus as in claim 7, wherein said sensor means comprises a first and second sensing diaphragm such that said first sensing diaphragm varies with changes in said pressure fluctuations and is situated between opposite sides of said first and second process diaphragm means and said second sensing diaphragm varies with changes in said process fluid pressure and temperature and is situated between opposite sides of said first and second process diaphragm means.

9. Apparatus as in claim 7, wherein said sensor means comprises a first and second sensing diaphragm such that said first sensing diaphragm varies with changes in said pressure fluctuations and temperature and is situated between opposite sides of said first and second process diaphragm means and said second sensing diaphragm varies with changes in said process fluid pressure and is situated between opposite sides of said first and second process diaphragm means.

10. Apparatus as in claim 7, wherein said sensor means comprises a first and second sensing diaphragm and a first sensing element such that said first sensing diaphragm varies with changes in said pressure fluctuations appearing between opposite sides of said first and second process diaphragm means, said second sensing diaphragm varies with changes in said process fluid pressure appearing between opposite sides of said first and second process diaphragm means and said first sensing element which varies with changes in said process fluid temperature having a single side subject to said temperature changes from said first process diaphragm being spaced from said first and second sensing diaphragm.

11. Apparatus as in claim 7, in which said sensor means is fabricated from the group consisting of a polysilicon semiconductor chip or a silicon semiconductor chip.

12. Apparatus as in claim 7, in which said sensor means contains resistive elements for sensing changes due to said pressure fluctuations, process fluid pressure, and temperature.

13. Apparatus as in claim 7, wherein said sensor means comprises a sensor body located outside of said flow-pipe section but fluidly connected thereto.

14. A method for determining the differential pressure and temperature of a process flow in a flow-pipe, which comprises the steps of:

a) producing a series of alternating pressure vortices in a flow stream by mounting a vortex-generating body in said flow-pipe;

b) transmitting said alternating pressure vortices caused by said vortex-generating body to a sensor means enclosed in a sensor housing with a first and second process diaphragms;

c) measuring said alternating pressure vortices caused by said vortex-generating body at said sensor means by use of a first sensing diaphragm having opposite sides subjected to said alternating pressure vortices from said first and second process diaphragms;

d) computing the amplitude of the differential pressure fluctuations generated by the vortices as measured from said sensor means; and e) measuring said process fluid temperature at said sensor means.

15. The method claimed in claim 14 wherein the step of measuring said process fluid temperature is done at said sensor means by a resistance means positioned onto a diaphragm having opposite sides subjected to said process fluid temperature from said first process and second process diaphragms.

16. The method claimed in claim 14 wherein the step of measuring said process fluid temperature is done at said sensor means by a resistance means positioned onto a diaphragm having a single side subjected to said process fluid temperature from said first process diaphragm.

17. The method claimed in claim 14 wherein the step of measuring said process fluid temperature is done at said sensor means by a first sensing element which varies with changes in said process fluid temperature having a single side subject to said temperature changes from said first process diaphragm and spaced from said sensing diaphragm.

18. A method for determining the differential pressure, process fluid pressure and temperature of a process flow for use in a vortex flowmeter contained in a flow-pipe section adapted to be coupled into a fluid flow conduit, which comprises:

a) producing a series of alternating pressure vortices in a flow stream by mounting a vortex-generating body in said flow-pipe section;

b) transmitting said alternating pressure vortices caused by said vortex-generating body to a sensor means enclosed in a sensor housing having sealed interior spaces liquid filled and formed in part with a first and second process diaphragms in contact with said process fluid, transmitting said alternating pressure vortices to said sensor means through said liquid fill which surrounds said sensor means;

c) measuring said alternating pressure vortices caused by said vortex-generating body at said sensor means by a first sensing diaphragm having opposite sides subjected to said alternating pressure vortices from said first and second process diaphragms;

d) computing the amplitude of the differential pressure of said alternating pressure vortices as measured from said sensor means;

e) transmitting the process fluid pressure to said sensor means;

f) measuring said process fluid pressure at said sensor means by a second sensing diaphragm having a single side subjected to said process fluid pressure transmitted from said first process diaphragm; and g) measuring said process fluid temperature at said sensor means which varies with changes in said temperature.

19. The method claimed in claim 18 wherein the step of measuring said process fluid temperature is made at said sensor means by said first sensing diaphragm which varies with changes in said temperature.

20. The method claimed in claim 18 wherein the step of measuring said process fluid temperature is made at said sensor means by said second sensing diaphragm which varies with changes in said temperature.

21. The method claimed in claim 18 wherein the step of measuring said process fluid temperature is done at said sensor means by a first sensing element which varies with changes in said process fluid temperature having a single side subject to said temperature changes from said first process diaphragm and spaced from said first and second sensing diaphragms.

22. The method claimed in claim 18 further comprising the steps of:

a) computing the flow velocity, Vf, as a function of said alternating pressure vortices as measured from said sensor means;

b) determining the process fluid density, d, as a function of said process fluid pressure and temperature as determined from said sensing means; and c) computing the flowmeter internal cross sectional area of the flow-pipe, a, whereby, the mass flow rate, MFR, is determined by the equation MFR = d * a * Vf.

* * * * *